INVENTOR
KEES TEER
BY Fred M. Vogel
AGENT

INVENTOR
KEES TEER
BY Fred M. Vogel
AGENT

INVENTOR
KEES TEER
BY Fred M. Vogel
AGENT 2,986,597

TRANSMISSION SYSTEM FOR TELEVISION SIGNALS

Kees Teer, Eindhoven, Netherlands, assignor, by mesne assignments, to North American Philips Company, Inc., New York, N.Y., a corporation of Delaware Filed Aug. 23, 1956, Ser. No. 605,818

Claims priority, application Netherlands Sept. 22, 1955

5 Claims. (Cl. 178—6)

Figure 1:
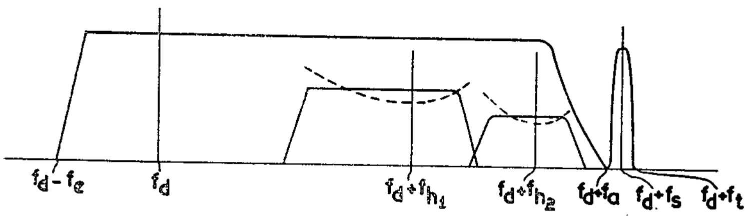

The invention relates to transmission systems for signals relating to television images or similar images which are line-scanned, at least one sub-carrier modulated by at least one signal which also relates to television images or similar images being transmitted within the frequency-band occupied by the first-mentioned signal.

Such systems can be used in colour-television. The first-mentioned signal preferably relates to the brightness component of the television images, and the signals which modulate the sub-carriers and generally have a band-width smaller than that of the first-mentioned signal, relate to the colour content of the television images. In most systems use is made of two signals of smaller band width.

The transmission of the signals of smaller band width can be effected in various manners.

In a known system, one sub-carrier is modulated in quadrature by both signals of smaller band width.

In another known system, the two signals of smaller band width modulating one and the same sub-carrier are transmitted alternately.

A further example is a system in which the two signals of smaller band width each modulate a separate sub-carrier and are transmitted continuously.

In the two last-mentioned systems, for the demodulation at the receiver-end of the signals modulating a sub-carrier, a band filter and a demodulator arrangement are sufficient without further information supplied by the transmitter being needed at the demodulator arrangement. Such information is required when, for example, the two signals of smaller band width modulate a sub-carrier in quadrature. In this event, demodulation in a receiver requires the use of two auxiliary oscillations the frequencies of which correspond to that of the sub-carrier, with a predetermined phase relationship between these auxiliary oscillations and the sub-carrier.

It is an object of the invention materially to improve the quality of the images finally reproduced whenever use is made, for the transmission of at least one signal, of at least one sub-carrier situated within the frequency range of another signal.

To this end, the transmission system in accordance with the invention is characterized in that, at the transmitter end, a sub-carrier with its sidebands produced by the modulation of a sub-carrier by at least one signal is added to the first-mentioned signal with a frequency distortion in which the amplitudes of the components having frequencies adjacent the sub-carrier frequency are attenuated relatively to the amplitudes of the other components of at least one sideband, and that, at the receiver end, this frequency distortion is substantially counteracted for this subcarrier and its sidebands.

The invention is based on recognition of the fact that the visual inconvenience of a sub-carrier and its sidebands in the final colour-image (and also in the image produced in a black-and-white receiver by the signals emitted by the transmitter) is determined to a higher extent by the direct-current component and the lower frequencies of the signals modulating a sub-carrier than by the higher frequencies of these signals and also that, conversely, the inconvenience of the first-mentioned signal in the images produced by the other signals is determined to a greater extent by the lower frequencies of the first-mentioned signal than by the higher frequencies.

Figure 2:
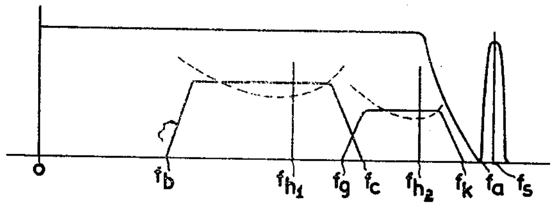
Figure 3:
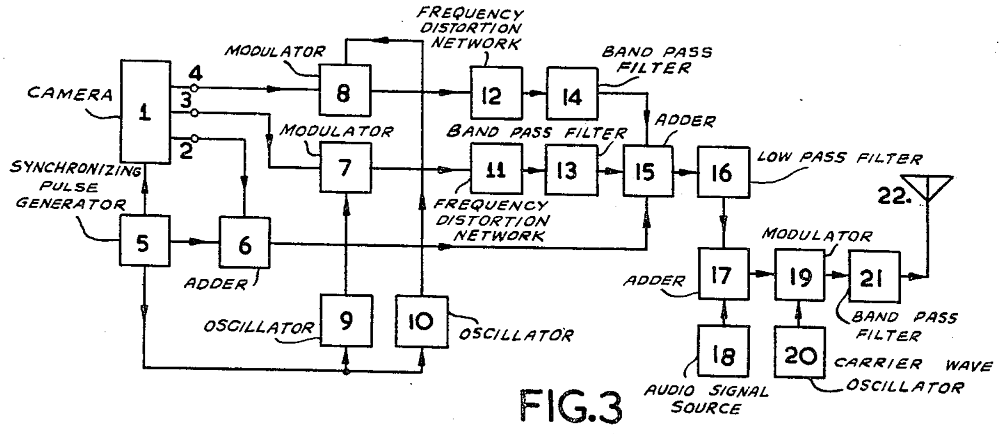
Figure 4:
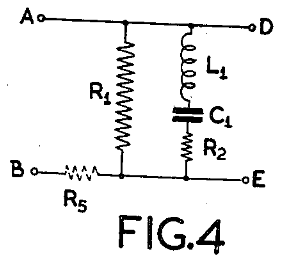
Figure 7:
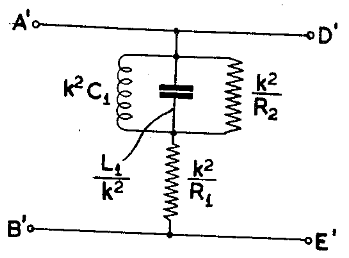
Figure 5:
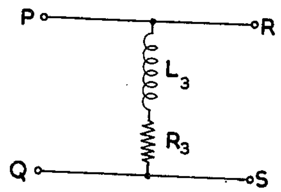
Figure 8:
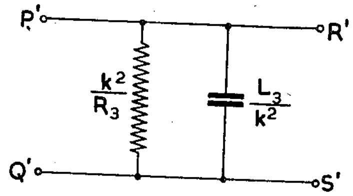
Figure 6:
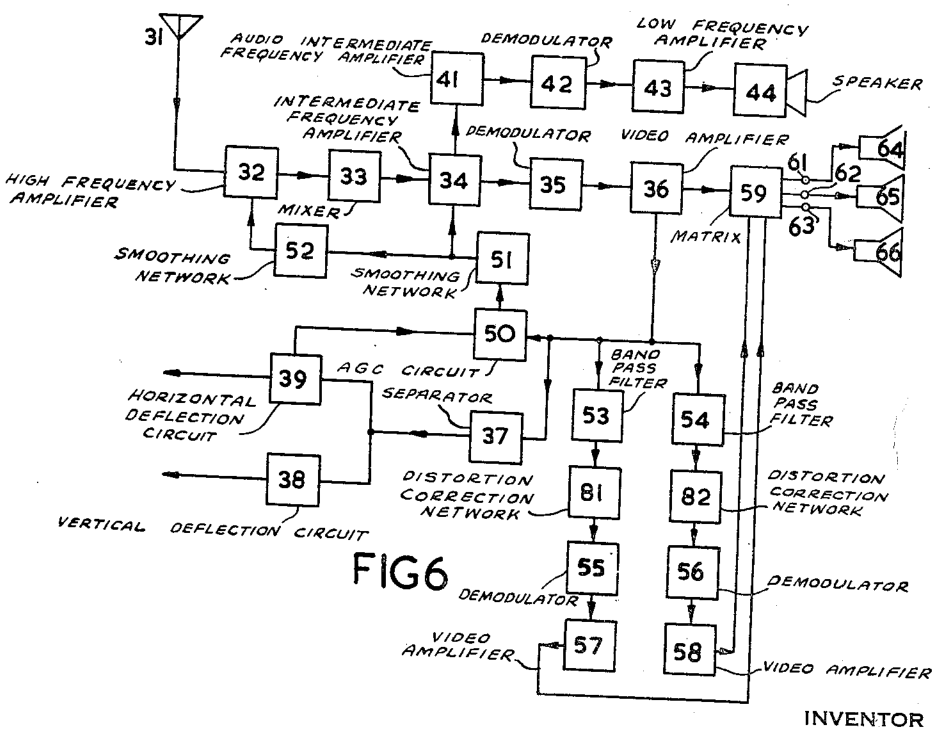

The invention will now be described in detail with refence to the accompanying drawings, in which:

Fig. 1 is a diagram of the frequency spectrum of three television signals during transmission according to the system in accordance with the invention, Fig. 2 shows the frequency spectrum of these three signals at the transmitter-end, Fig. 3 shows diagrammatically an embodiment of a transmitter for use in the system in accordance with the invention, Figs. 4 and 5 show networks which may be used in a system in accordance with the invention at the transmitter end, Fig. 6 shows diagrammatically an embodiment of a receiver for use in a system in accordance with the invention, Figs. 7 and 8 show networks which may be used in a system in accordance with the invention at the receiver end, and Figs. 9, 10, 11 and 12 show characteristic curves associated with the networks shown in Figs. 4, 5, 7 and 8 respectively.

Referring now to Fig. 1, this figure shows, by way of example, a frequency spectrum associated with a colour-television system in which the invention may be used. Such a frequency spectrum, which extends from a frequency $f_d-f_e$ to a frequency $f_d+f_a$, is produced by modulating a carrier having a frequency $f_d$ by three signals one of which extends over a frequency-band of from 0 to $f_a$, a second extends from $f_b$ to $f_c$, and a third extends from $f_g$ to $f_k$, as is shown in Fig. 2, the lower sideband being partially suppressed. The signal of large band width may, for example, be a brightness signal; the second signal between the frequencies $f_b$ and $f_c$ is produced by modulating a sub-carrier having a frequency $f_{h1}$ by one of the colour-signals; the third signal between the frequencies $f_g$ and $f_k$ is produced by modulating a sub-carrier of frequency $f_{h2}$ by the other colour-signal.

Obviously, such a frequency spectrum is also produced by modulating a carrier of frequency $f_d$ by the signal of large band width and by modulating two carriers of frequencies $f_d+f_{h1}$ and $f_d+f_{h2}$ each by a colour-signal. However, in this event, after demodulation in the receiver the carriers of frequencies $f_d+f_{h1}$ and $f_d+f_{h2}$ again appear in the video-frequency spectrum of the signal of large band width as sub-carrier of frequencies $f_{h1}$ and $f_{h2}$.

Obviously, the sub-carriers preferably have such frequencies and may show such sudden phase changes that their presence in the displayed brightness signal gives rise to minimum interference. However, the visibility of these sub-carriers cannot be completely reduced to zero by this method. Experiments have shown that the largest contribution to this interference is provided by the sub-carrier frequencies themselves and by the frequencies adjacent the sub-carriers. This may be appreciated if it is borne in mind that the energy of a television signal is largely concentrated in the direct-current-component and the lower frequencies of this signal.

In order to reduce the interference, the entire level of a sub-carrier with its sidebands might be reduced relatively to the brightness signal. It is true that in this case the interference in the image of the brightness signal by this sub-carrier is reduced, which interference shows itself as a fine point-structure in the image. However, in the colour reception the inconvenient influence of noise and that of the components of the brightness signal situated in the frequency range of the sub-carrier and its sidebands are highly increased in the signal produced by demodulation of this sub-carrier. Since, in a colour-television receiver, this interference is produced in the low-frequency parts of the signals finally reproduced, this measure adversely affects the colour reception and this detrimental influence is compensated only slightly by the improved quality of the brightness signal. In view of the above-mentioned fact that the energy of the television-signal is largely concentrated in the direct-current component and the lower frequencies of this signal so that the energy materially decreases with increasing frequency, the influence of the frequencies of the above-mentioned components of the brightness signal in the signals produced by demodulation of the sub-carriers increases as their proximity to the frequencies $f_b$ and $f_g$ respectively increases. Naturally, the said measure provides an improvement in the reproduction of the signals by means of a black-and-white receiver, for in this case the sub-carriers are not demodulated so that the last-mentioned detrimental influence cannot occur at all.

According to the invention, at the transmitter-end a subcarrier with its sideband is added to the brightness signal with a frequency distortion by which the amplitude of the components having frequencies adjacent the sub-carrier frequencies are attenuated relatively to the amplitudes of the other components.

In Figs. 1 and 2 this frequency distortion is shown diagrammatically by broken lines.

This measure enables the quality of the colour reception to be considerably improved with constant quality of the black-and-white reception or, conversely, enables the quality of the black-and-white reception to be highly improved with constant quality of the colour reception.

The improvement in the quality of the colour-reception may be obtained not only by reducing the interference in the colour signals but also by increasing the band width of the colour signals.

Obviously, the measure in accordance with the invention may be so chosen that it results in an improvement in the quality of the colour reception and of the black-and-white reception, in which case these quality improvements are naturally quantitatively less than in the above-mentioned cases. The favourable effect of the said measure with respect to the improvement of the quality of the black-and-white reception is due to the fact that the energy of the components of the sub-carrier with its sidebands which provide the greatest interference in reproduction, that is to say the components the frequencies of which are situated in the proximity of the sub-carrier frequency, is attenuated relatively to the brightness-signal.

The favourable effect of the said measure with respect to the improvement in the quantity of the colour reception is due to the fact that the components of the brightness signal and the noise-components situated in the frequency range in which the measure in accordance with the invention is used, are attenuated relatively to the sideband frequencies of the subcarriers modulated by the colour signals. This obviously results in a reduction of the interference produced by the said components in the colour signals.

If the interference level is low enough already, the band width of the colour signals can be increased, with a constant interference level, for the band width of the colour-signals is primarily limited by the interference produced by the brightness components.

It should be noted that the relative amplification of the higher frequencies of the sidebands of the sub-carriers between $f_{h1}$ and $f_c$ and between $f_{h2}$ and $f_k$ respectively as compared with the associated lower frequencies of the sidebands, as is shown diagrammatically in the figures, is not necessary in such a degree with respect to the interference of the brightness components, since in the direction from $f_{h1}$ to $f_c$ and from $f_{h2}$ to $f_k$ respectively, the energy of the components of the brightness signal decreases.

The use of the measure in accordance with the invention provides not only the above-mentioned advantages but also the following advantage.

On one side or on both sides of the desired frequency range (sub-carrier with sidebands) the compensating network provided in the receiver will considerably suppress the adjacent undesirable frequency ranges, so that this compensating network takes over part of the function of the band filter required to separate colour information from the brilliance signal. Since the networks used for distortion and compensation are of simple design, this results in a simplification of the band filter constructions in the receiver.

Fig. 3 shows a simplified embodiment of a transmitter for a transmission system in accordance with the invention in block-schematic form. A device 1 produces the brightness signal at its output 2 and the two colour signals at its outputs 3 and 4 respectively. For this purpose, the device 1 comprises the required cameras and the further circuit arrangements required. In a device 5 the line and frame synchronizing pulses are generated. These pulses are supplied to the device 1 for the control of the deflecting means of the cameras and also to an addition device 6 to which the brightness signal appearing at the output 2 is also supplied. The output signals appearing at the outputs 3 and 4 of the device 1 are supplied to modulators 7 and 8 respectively, to which modulator sub-carriers having frequencies $f_{h1}$ and $f_{h2}$ respectively are also supplied. These sub-carriers are obtained from devices 9 and 10 which comprise suitable oscillators. In view of the above-mentioned frequency-choice and the sudden phase changes which may occur to reduce mutual interference between the various signals in reproduction, these oscillators are generally controlled by the line- or frame-synchronizing pulses supplied by the device 5. The output signal of the modulator 7 is supplied to a network 11 by which the amplitudes of the components having frequencies adjacent the sub-carrier frequency $f_{h1}$ are attenuated relatively to the amplitude of the further components. An example of such a network is shown in Fig. 4. The network comprises the parallel connection of a resistance $R_1$ and the series combination of a resistance $R_2$, and inductance $L_1$ and a capacitance $C_1$. The circuit consisting of the inductance $L_1$ and the capacitance $C_1$ is tuned to the frequency $f_{h1}$. The voltage which signal components supplied to terminals A and B having a frequency approximately equal to $f_{h1}$ produces across terminals D and E is about proportional to $$\frac{R_1 \cdot R_2}{R_1+R_2}$$

the voltage which a signal component having a frequency widely different from $f_{h1}$ produces across the terminals D and E is about proportional to $R_1$. From the fact that $$\frac{R_1 \cdot R_2}{R_1+R_2}$$

is less than $R_1$ it follows that such a network provides the desired frequency distortion. In practice, a ratio between $R_1$ and $R_2$ of 4.5:1 proves to provide satisfactory results.

Figure 9:
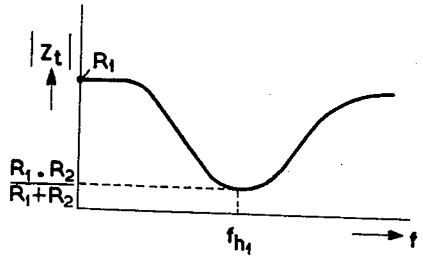

Fig. 9 shows, for the network shown in Fig. 4, the characteristic curve indicating the relationship between the absolute value of an impedance $Z_t$, measured across the terminals D and E, and the frequency $f$ of the current supplied to the terminals A and B.

The output signal from the modulator 8 is supplied to a network 12 by which the amplitudes of the frequencies in the proximity of the subcarrier frequency $f_{h2}$ are attenuated relatively to the amplitude of the other frequencies. This network may be designed similarly to the network shown in Fig. 4. However, in this case the circuit comprising the inductance $L_1$ and the capacitance $C_1$ is tuned to the frequency $f_{h2}$.

The output signal from the network 11 is supplied to a band-pass filter 13 having a pass-range between the frequencies $f_d$ and $f_c$; the output signal from the network 12 is supplied to a band-pass filter 14 having a pass-range between the frequencies $f_g$ and $f_k$. The output signals from the addition device 6, the band-pass filter 13 and the band-pass filter 14 are combined in an addition device 15.

The output signal from the device 15 is now supplied to a low-pass filter 16 having a cut-off frequency $f_a$ and subsequently combined, in an addition device 17, with the sound signal modulating a carrier wave having a frequency $f_s$. This modulated sound signal is supplied by a device 18 comprising the required microphones, amplifiers, modulators etc.

The output signal from the device 17 can now be supplied to a transmission cable or, as is shown in the figure, can be supplied to a modulator 19 in which this signal modulates a carrier wave having a frequency $f_d$ provided by a device 20, the resulting signal being supplied to a band-pass filter 21 having a pass-range between the frequencies $f_d - f_e$ and $f_d + f_t$ (see Fig. 1), after which it is fed to a transmitter aerial 22.

Figure 10:
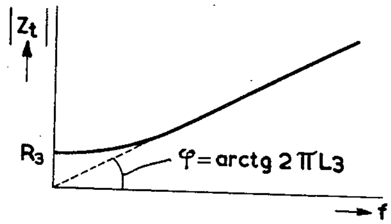

Obviously, the desired frequency distortion may be introduced differently. It may, for example, be produced by supplying the output signal from a terminal 3 or 4 of the device 1 to a network by which the direct-current component and the lower frequencies of the signal are attenuated relatively to the higher frequencies of this signal, the output signal from such a network being supplied to a modulator 7 or 8. An embodiment of such a network is shown, by way of example, in Fig. 5. The network consists of a circuit comprising the series combination of a resistance $R_3$ and an inductance $L_3$. The voltage produced by a signal component which is supplied to terminals P and Q and has a comparatively low frequency, across terminals R and S is about proportional to $R_3$; however, as the frequency of such a signal component increases the voltage produced across the terminals R and S also increases. Fig. 10 shows the characteristic curve associated with the network shown in Fig. 5. It will be appreciated that the output signals of the modulators 7 and 8 can now be supplied to the band filters 13 and 14 respectively without further expedients. The use of a network of the kind shown in Fig. 5 connected in the input circuit of a modulator in which a sub-carrier is modulated by a colour-signal may give rise to over-modulation of this sub-carrier in view of the large increase in the amplitude of the higher frequencies. If, at the receiver end, use is made of synchronous demodulation (that is to say, demodulation in which the demodulator arrangement has further information supplied to it from the transmitter), this over-demodulation has no detrimental effect.

Fig. 6 is a block-diagram of a simplified embodiment of a receiver for the reception of signals emitted by a transmitter of the kind described with reference to Fig. 3. Reference numeral 31 denotes a suitable aerial system for the reception of the carrier modulated by the television signals. The aerial system 31 is coupled to a high frequency amplifier 32 and a mixing stage 33 including a suitable oscillator. The output signal from the stage 33 is supplied to an intermediate-frequency amplifier 34 which is coupled to a demodulator 35 and a video-amplifier 36.

The carrier modulated by the sound signal can be separated from the television signal either in the intermediate frequency stage 34 or in the demodulator 35 according as use is made or is not made of the intercarrier principle, and can be supplied to an intermediate-frequency stage 41 which again is coupled to a sound demodulator 42. The output signal from the demodulator 42 is supplied, by way of a low-frequency amplifier 43, to at least one loudspeaker 44. In Fig. 6, the sound carrier is separated from the television signal in the intermediate-frequency stage 34.

The synchronizing signals included in the output signal from the video amplifier 36 are recovered from this output signal in the separating circuit 37.

The synchronizing pulses for the vertical deflection are supplied to a device 38 for synchronizing the saw-tooth generator which forms part of this device; the output currents from 38 are supplied to the vertical deflector coils (not shown) of the various display tubes.

The synchronizing pulses for the horizontal deflection are supplied to a device 39 for synchronizing the saw-tooth generator which forms part of this device; the output currents from 39 are supplied to the horizontal deflector coils (not shown) of the display tubes.

These devices 38 and 39 also comprise any flywheel circuit which may be required, whilst, in addition, from the device 39 a direct voltage may be obtained in known manner from the fly-back of the line saw-tooth generator, which voltage may act as the high tension for the display tubes.

For the gain control, the fly-back pulses from the device 39 may, for example, be supplied to a device 50 to which the output signal from the video-amplifier 36 is also supplied. The device 50 contains a gate-circuit which, under the action of the said fly-back pulses, becomes conductive only during the occurrence of the line- and frame-synchronizing pulses. The pulses appearing at the output of the gate-circuit which have amplitudes proportional to the corresponding peak values of the synchronizing pulses are a measure of the level of the signal produced at the output of the video-amplifier 36. The pulses thus produced can be supplied as control voltages to the high frequency and intermediate-frequency stages through smoothing networks 51 and 52.

The output signal from the amplifier 36 is also supplied to a band-pass filter 53 having a pass-range between the frequencies $f_b$ and $f_c$ and to a band-pass filter 54 having a pass-range between the frequencies $f_g$ and $f_k$.

The output signals from the band-pass filter 53 is supplied to a network 81 in which the frequency distortion which is present in the signal concerned is counteracted.

The network 81 may, to this end, be reciprocal to the network 11 at the transmitter end. When the impedance of the network 11 is referred to as $Z_t$ and the impedance of the network 81 as $Z_r$, the reciprocity condition is:

$$Z_t . Z_r = k^2$$

where $k$ is a constant.

Assuming the network 11 to be designed as is shown in Fig. 4, $$Z_t = \left( \frac{1}{R_1} + \frac{1}{R_2 + \frac{1}{j\omega C_1} + j\omega L_1} \right)^{-1}$$

where $\omega = 2\pi f$.

From this it follows for $Z_r$:

$$Z_r = \frac{k^2}{R_1} + \frac{1}{\frac{R_2}{k^2} + \frac{1}{j\omega C_1 k^2} + \frac{j\omega L_1}{k^2}}$$

Figure 11:
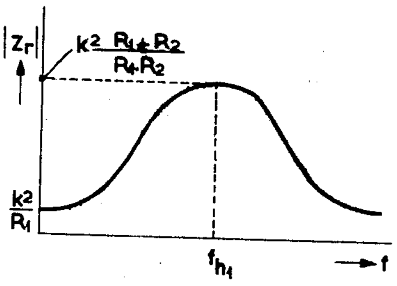

Such an impedance can be a network comprising the series combination of a resistance of value $k^2/R_1$ and the parallel combination of a resistance of value $k^2/R_2$, an inductance of value $C_1 k^2$ and a capacitance of value $L_1/k^2$. Such a network is shown in Fig. 7. Fig. 11 shows the frequency characteristic of this network which shows the relationship between the impedance measured across terminals D′ and E′ and the frequency of the current supplied to terminals A′ and B′.

It is assumed that the network 81 is excited by a current supply.

If, however, it is excited by a voltage supply, this network 81 must be designed similarly to the network 11 of Fig. 3 which is shown in detail in Fig. 4. In this case $Z_r$ must satisfy the condition:

$$Z_r = k^2 Z_t$$

The output voltage can in this event be taken from a resistance $R_5$, which is shown in Fig. 4 in broken lines. The influence of such a resistance $R_5$ in the network 81 can be compensated for at the transmitter end by the inclusion of such a resistance in the network 11.

The output signal from the band-pass filter 54 is supplied to a network 82 in which the frequency distortion contained in the signal concerned is similarly counteracted.

The output signals from the networks 81 and 82 are supplied to demodulator 55 and 56 respectively which are connected to video amplifiers 57 and 58 respectively. The output signals of the video amplifiers 36, 57 and 58 are supplied to a device 59 comprising a suitable combination of networks which is known per se. At the outputs 61, 62 and 63 of this device 59 signals are produced which relate to the red, green and blue light-components of the displayed scene respectively. These signals can now be supplied to the control elements of display tubes 64, 65 and 66 respectively which reproduce these signals in red light, green light and blue light respectively. Obviously, these signals can also be supplied to the control elements of a single three-colour display-tube having three electron-guns. If a three-colour display-tube having a single electron-gun is used, the signals must be supplied to the control element of this tube in a predetermined sequence.

In the above, any phase-shifts which may occur between the various signals have been neglected; these phase-shifts can be compensated in known manner, for example, by means of delay lines.

It will be appreciated that, since the compensating networks 81 and 82 in the receiver materially suppress the undesirable frequency-ranges adjacent the desired frequency-ranges on both sides, these compensating networks have taken over part of the function of the band-pass filters required to separate colour information from the brightness signal, and this obviously means a simplification of the band-pass filter constructions in the receiver.

The frequency distortion produced in the transmitter may alternatively be compensated for after the demodulation of the sub-carriers, provided that this frequency-distortion has not introduced over-modulation in the transmitter.

Assuming the frequency distortion at the transmitter end to be produced by a network connected in the circuit between a colour-signal generator and a modulator, that is to say by a network of the kind shown in Fig. 5 and assuming also that a demodulator at the receiver end has the nature of a current supply, the impedance of the compensating network $Z_r$, if the impedance of the network shown in Fig. 5 is again denoted by $Z_t$, must fulfil the condition:

$$Z_r . Z_t = k^2$$

In this case:

$$Z_t = R_3 + j\omega L_3$$

Consequently:

$$Z_r = \frac{k^2}{R_3 + j\omega L_3}$$

Figure 12:
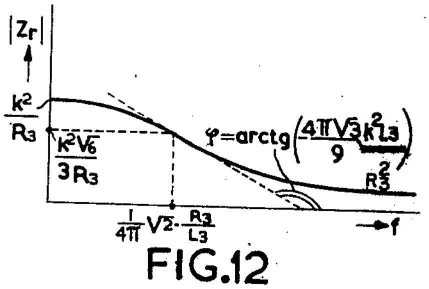

Such an impedance can be the parallel combination of a resistance of value $k^2/R_3$ and a capacitance of value $L_3/k^2$. Such a network is shown in Fig. 8 and the associated frequency characteristic is shown in Fig. 12.

When a demodulator at the receiver end has the nature of a voltage supply use may be made of a network designed similarly to that shown in Fig. 5. The output of the network compensating for the frequency-distortion can now be taken from the resistance $R_3$.

Finally it should be noted that, although in the above only at least partial double-sideband transmission of the modulated sub-carriers has been referred to, it will be obvious that the invention can also be used with single sideband transmission of the modulated sub-carriers.

What is claimed is:

1. A television system comprising a transmitter having means for producing a first television signal occupying a first frequency band, means for producing a second television signal occupying a second frequency band lying within said first frequency band, said last-named means comprising a sub-carrier generator, a video signal source and modulator means connected to modulate said sub-carrier with said video signal thereby to produce a modulated sub-carrier having sidebands lying in said second frequency band, and attenuation means connected to attenuate the amplitude of the frequency components which lie adjacent to the sub-carrier frequency to a greater degree than the frequency components more remote to the sub-carrier frequency, said transmitter further comprising means for combining and transmitting said first and second television signals, and a receiver for receiving said transmitted signals and comprising frequency compensation means for compensating for said attenuation of the frequency components of said second signal.

2. A television transmitter comprising means for producing a first television signal occupying a first frequency band, means for producing a second television signal occupying a second frequency band lying within said first frequency band, said last-named means comprising a sub-carrier generator, a video signal source and means to modulate said sub-carrier with said video signal thereby to produce a modulated sub-carrier having sidebands lying in said second frequency band, and means connected to attenuate the amplitude of the frequency components which lie adjacent to the sub-carrier frequency to a greater degree than the frequency components more remote to the sub-carrier frequency, said transmitter further comprising means for combining and transmitting said first and second television signals.

3. A transmitter as claimed in claim 2, in which said attenuation means comprises a frequency-dependent network connected at a point in the transmitter between said video signal source and said means for combining the first and second television signals.

4. A transmitter as claimed in claim 3, in which said frequency-dependent network is connected between said modulator means and said means for combining the first and second television signals, said network having a frequency characteristic attenuating said sub-carrier and the frequency components adjacent to the sub-carrier to a greater degree than the frequency components more remote to the sub-carrier frequency.

5. A transmitter as claimed in claim 3, in which said frequency-dependent network is connected between said video signal source and said modulator means, said network having a frequency characteristic attenuating the low frequency components of said video signal to a greater degree than the high frequency components of said video signal.

References Cited in the file of this patent

UNITED STATES PATENTS

| | | |
|---|---|---|
| 2,635,140 | Dome | Apr. 14, 1953 |
| 2,657,253 | Bedford | Oct. 27, 1953 |
| 2,787,660 | Teer | Apr. 2, 1957 |
| 2,828,354 | Haantjis et al. | Mar. 25, 1958 |
| 2,838,597 | De Vrijer | June 10, 1958 |